Nov. 2, 1954 — T. W. MARCHECK — 2,693,246
AIR FILTER
Filed Sept. 26, 1952
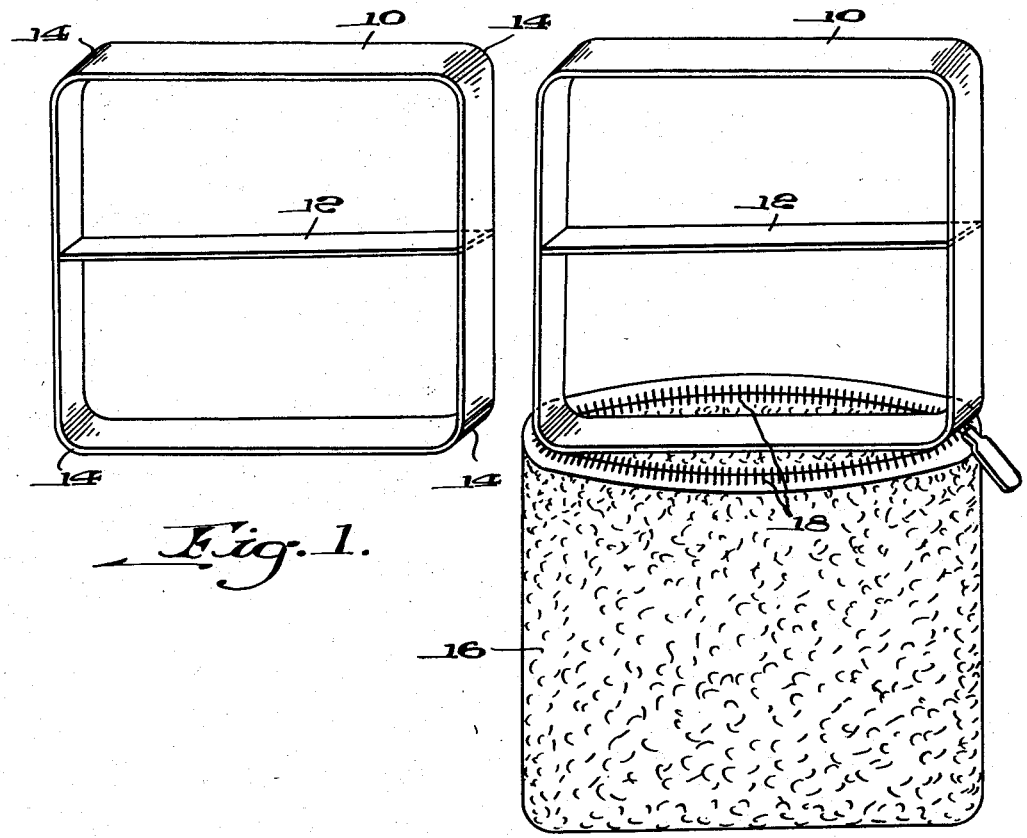
Fig. 1.
Fig. 2.
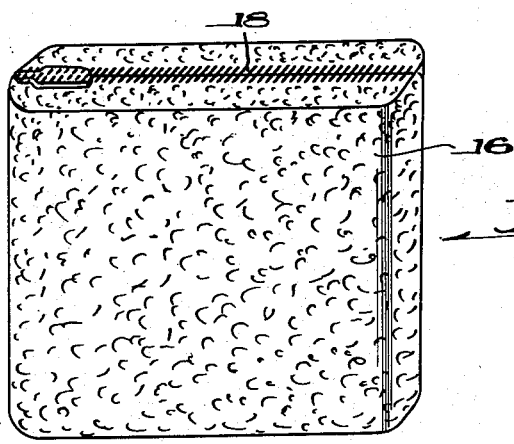
Fig. 3.
INVENTOR.
THOMAS W. MARCHECK
BY
Christy, Parmelee and Strickland
his ATTORNEYS.

United States Patent Office 2,693,246
Patented Nov. 2, 1954

2,693,246

AIR FILTER

Thomas W. Marcheck, Pittsburgh, Pa.

Application September 26, 1952, Serial No. 311,711

4 Claims. (Cl. 183—51)

This invention relates to air filters. More particularly the invention relates to filters for removing dust, dirt and pollen from atmospheric air to purify the air to be used in room air conditioning and in hot air heating.

Air filters are quite widely used in conjunction with house heating to take dust and fumes out of the air which act to mark and soil the walls adjacent the points of entrance of heated air from the furnace. Metal screens are often used for this filtering operation, but the metal screens are not very efficient in their power to remove the impurities. The metal screens are not easy to clean and the acids and moisture in the air are generally quite corrosive and destructive to metal screens.

Another type of air filter in common use is composed of oil treated paper formed into a maze of narrow passages which wind in reversing directions to force the air into contact with the walls of the passages to collect and hold the dust fumes and impurities. The paper or cardboard filters are generally not cleanable and are discarded when they become dirty.

Many people allergic to dusts and pollens and an efficient air filter is required to remove such impurities. The life of filters which are efficient in removing pollen from air is quite short and consequently such filters are generally used for a considerable period when they do not effectively remove the undesired impurities from the air, because of the difficulty of cleaning the filter or the inconvenience of changing filters.

The primary object of the present invention is to provide an air filter which may be easily and effectively cleaned.

Another object of the invention is to provide an air filter that is resistant to corrosion and destruction by the impurities being removed from the air.

A further object of the invention is to provide an air filter which is relatively inexpensive and can be easily mounted in and removed from the filtering apparatus.

With these and other objects in view, the invention consists in the air filter herein illustrated and described and particularly defined in the appended claims.

The various features of the invention are illustrated in the accompanying drawings in which:

Fig. 1 is a perspective view of the frame upon which the filter of the present invention is mounted;

Fig. 2 is a perspective view showing in the lower portion thereof the preferred filter bag and above the bag is the frame of Fig. 1 ready to be inserted into the bag; and Fig. 3 is a perspective view of the completed filter with the bag tightly sealed over the frame.

The filter frame illustrated in the drawing is shown as square in shape with a central strut or brace to strengthen the frame. This frame may be made of wood or metal or plastic. If constructed of metal, the outer rim 10 of the frame will be one piece welded at the meeting ends and the strut 12 will be welded to the rim. If made of wood, the rim 10 is preferably made of moulded ply wood in one piece with the meeting ends connected by a spliced joint. A ply wood strut 12 would be fastened by nails or screws to the frame. If the frame is made of plastic, the rim and strut are moulded in one piece.

The corners 14 of the frame are preferably rounded to avoid wear on the bag. It is apparent, however, that the corners may be made square. Further, the frame may be made of any desired shape or size to fit the air filtering apparatus in which it is to be mounted.

The filter bag 16 is preferably made of terry cloth and carefully fitted to tightly cover the frame rim 10. The top of the bag is provided with a zipper 18 which extends over substantially the full length of the bag top to provide an opening through which the frame may pass when putting the bag on and taking the bag off the frame. The zipper is positioned over a flat surface of the frame so that a tight joint is made to cause the air being filtered to pass through the terry cloth.

Terry cloth is particularly well adapted for filtering air in that the cloth is porous, but the surface has a thick covering of loose end threads or nap which act to hold the impurities such as pollen, dust and oily dirt. Preferably the terry cloth has a thick nap on both sides of the cloth. This cloth can be readily cleaned with the usual laundering methods. The bag should be washed on the inside and outside and the zipper facilitates turning the bag inside-out. The ease of removing and washing the bag insures that the bags will be changed often enough to provide an efficient filtering of the air.

The construction of the filter provides a double filtering action. The air passes first from the outside into the bag to take out the major portion of the impurities and is then passed from the inside to the outside of the bag for the second filtering operation. The filter construction is such that the sides may be reversed to obtained the most effective use of the bag.

The preferred form of the invention having been thus described what is claimed as new is:

1. An air filter unit constructed to be so mounted in a portion of a closed passage way as to cause the air to pass through two separate thicknesses of cloth comprising a frame having an outer rim of substantial width or thickness, a cloth bag constructed to snugly fully enclose the frame and a readily openable closure device secured to the portion of the bag positioned along one edge of the frame to permit the bag to be quickly removed from the frame for cleaning.

2. The filter defined in claim 1 in which the bag is constructed of terry cloth.

3. The filter defined in claim 1 in which the bag has a zipper closure device along one edge thereof.

4. An air filter comprising a rectangular frame with each edge of the frame being a solid piece of uniform substantial width, said unit being constructed to extend closely to the inside wall of a rectangular air passageway to prevent air from passing between the walls of the passageway and the walls of the frame, a cloth bag shaped to snugly enclose the frame with a zipper closing device along one edge of the frame, said frame with the cloth thereon when placed on edge in a passageway being arranged to cause all air to pass through two rectangular faces of cloth and the space inside the frame between the walls of cloth.

References Cited in the file of this patent

UNITED STATES PATENTS

| Number | Name | Date |
|--------|------|------|
| 826,390 | Van Law | July 17, 1906 |
| 2,453,206 | Donat | Nov. 9, 1948 |